US010209088B2

(12) United States Patent
Cheng

(10) Patent No.: US 10,209,088 B2
(45) Date of Patent: Feb. 19, 2019

(54) METHOD AND APPARATUS FOR ROUTE CALCULATION CONSIDERING POTENTIAL MISTAKES

(71) Applicant: HERE Global B.V., Eindhoven (NL)

(72) Inventor: Wanli Cheng, Seattle, WA (US)

(73) Assignee: HERE Global B.V., Eindhoven (NL)

(*) Notice: Subject to any disclaimer, the term of this patent is extended or adjusted under 35 U.S.C. 154(b) by 104 days.

(21) Appl. No.: 15/172,909

(22) Filed: Jun. 3, 2016

(65) Prior Publication Data
US 2017/0350717 A1 Dec. 7, 2017

(51) Int. Cl.
G01C 21/30 (2006.01)
G01C 21/36 (2006.01)
G01C 21/34 (2006.01)

(52) U.S. Cl.
CPC ..... G01C 21/3667 (2013.01); G01C 21/3453 (2013.01)

(58) Field of Classification Search
CPC G01C 21/3667; G01C 21/3453; G01C 21/26; G01C 21/36; G01C 21/00; G01C 21/3611; G08G 1/096894
USPC .................................................. 701/400, 533
See application file for complete search history.

(56) References Cited

U.S. PATENT DOCUMENTS 7,680,749 B1* 3/2010 Golding ............. G01C 21/3484
706/14
8,126,641 B2* 2/2012 Horvitz ............. G01C 21/3415
340/995.19

9,810,545 B2* 11/2017 Golding ............. G01C 21/3492
2005/0159889 A1* 7/2005 Isaac .................. G01C 21/3484
701/414
2005/0216190 A1* 9/2005 Obata ................. G01C 21/3415
701/442
2009/0125229 A1* 5/2009 Peri ........................ G01C 21/32
701/533

(Continued)

FOREIGN PATENT DOCUMENTS

RU 2572936 C2 1/2016
WO 2010072258 A1 7/2010

OTHER PUBLICATIONS

Duckham et al., "Simplest Paths: Automated Route Selection for Navigation", Proceedings of the International Conference on Spatial Information Theory 2003, Sep. 24-28, 2003, vol. 2825, pp. 169-185.

*Primary Examiner* — Shardul D Patel
(74) *Attorney, Agent, or Firm* — Ditthavong & Steiner, P.C.

(57) ABSTRACT

An approach is provided for route calculation using a navigation system by considering potential mistakes. Using the navigation system, at least one route is calculated. A map database is queried to identify intersections along the at least one route. A predicted probability of a user making a routing mistake at the intersections is calculated. A travel time, travel distance, or a combination thereof that is predicted to result from the routing mistake is calculated. The travel time, the travel distance, or a combination thereof represents a predicted severity of the routing mistake. At least one route is recalculated to accept or avoid the intersections based on the predicted probability and the predicted severity of the routing mistake. The recalculated route is presented in a user interface as an optimal route.

20 Claims, 9 Drawing Sheets

(56) References Cited

U.S. PATENT DOCUMENTS

| | | | |
|---|---|---|---|
| 2010/0010733 A1* | 1/2010 | Krumm | G01C 21/3484 |
| | | | 701/533 |
| 2010/0094534 A1* | 4/2010 | Naick | G01C 21/3484 |
| | | | 701/532 |
| 2010/0268460 A1* | 10/2010 | Wan | G01C 21/3415 |
| | | | 701/414 |
| 2012/0259547 A1* | 10/2012 | Morlock | G01C 21/32 |
| | | | 701/533 |
| 2016/0341564 A1* | 11/2016 | Cheng | G01C 21/3641 |

* cited by examiner

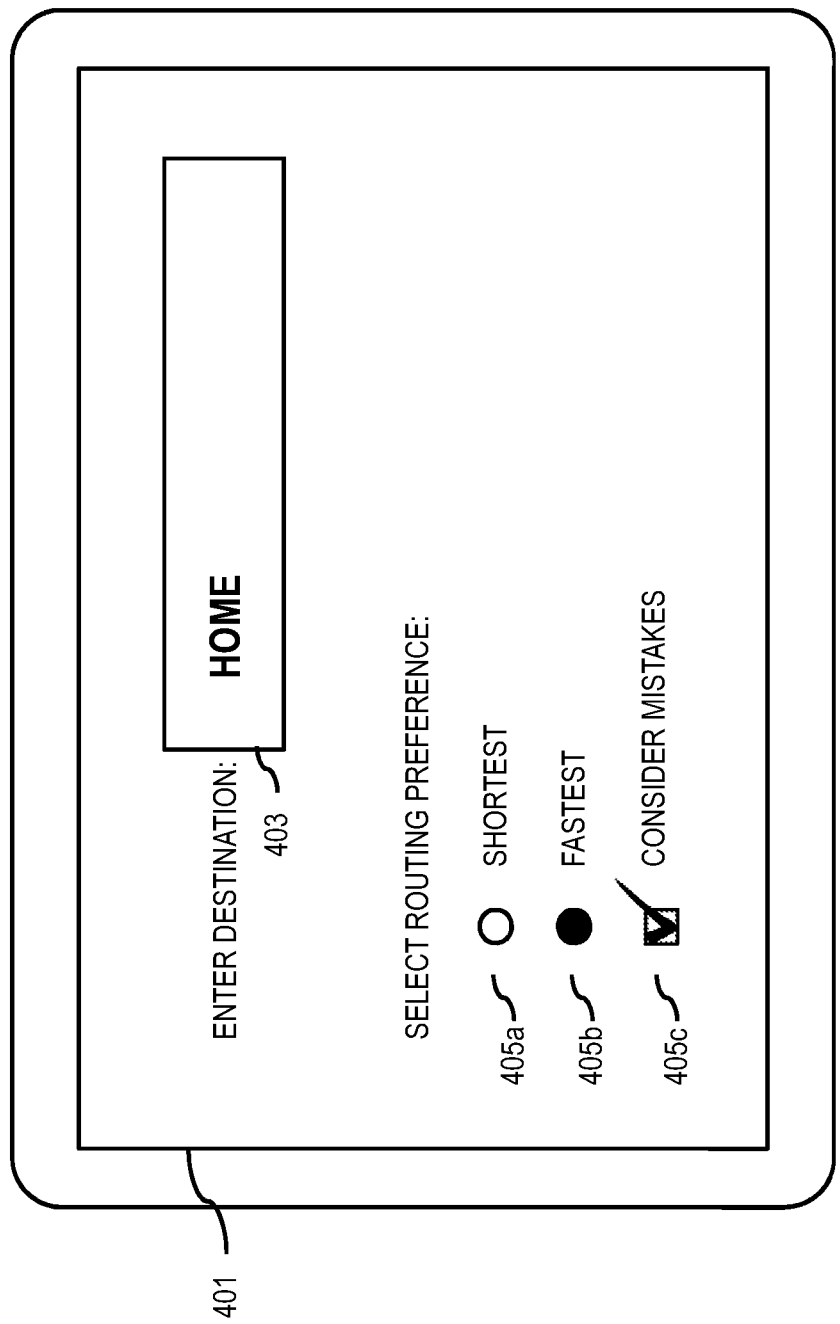

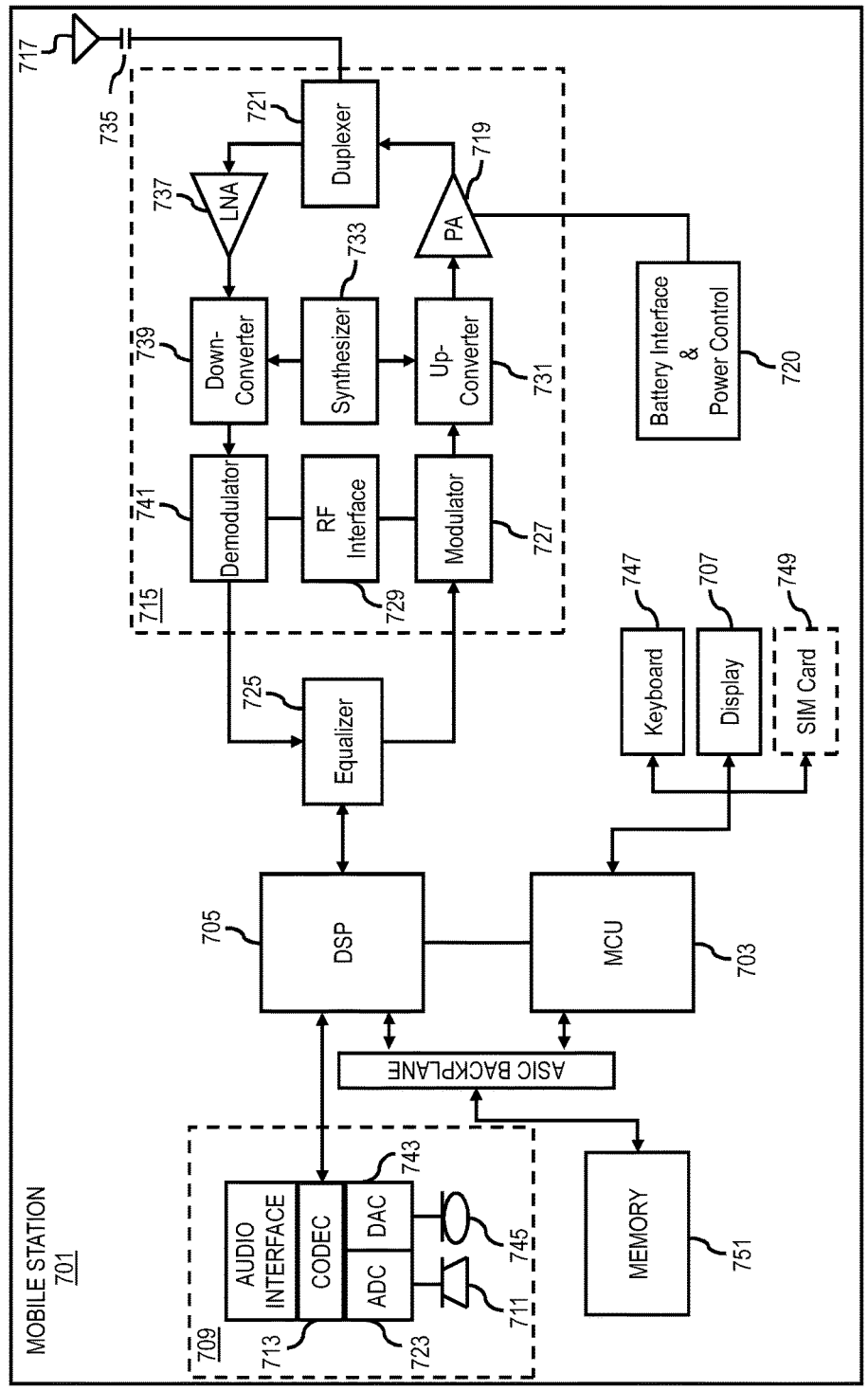

METHOD AND APPARATUS FOR ROUTE CALCULATION CONSIDERING POTENTIAL MISTAKES

RELATED APPLICATION

U.S. patent application Ser. No. 14/719,891, titled "Method and Apparatus for Providing Personalized Routing Based on User Routing Behaviors," filed May 22, 2015, (hereinafter "U.S. Ser. No. 14/719,891") is incorporated by reference herein in its entirety. The method and apparatus for generating a predictive model of potential user behavior while traveling a route as described in U.S. Ser. No. 14/719,891 comprise one example process for predicting a probability that a user will make a routing mistake when following a navigation route. In one embodiment, this example process can be used with the various embodiments described herein to calculate a navigation route that considers potential routing mistakes by a navigation system user.

BACKGROUND

Navigation systems and services have enjoyed widespread acceptance and use by consumers, but service providers and developers of such systems continue to face significant technical challenges to personalizing these systems and services for individual users. For example, personalization options have commonly been limited to selecting an optimal route based on distance (e.g., find shortest route) or travel time (e.g., find route with shortest travel time). However, these limited options may result in calculated navigation routes that users are not able to follow. Accordingly, service providers are challenged to find technical solutions to enabling navigation routes that can more accurately be personalized for individual users.

SOME EXAMPLE EMBODIMENTS

Therefore, there is a need for an approach for route calculation that considers potential routing mistakes by a user.

According to one embodiment, a computer-implemented method for performing a route calculation using a navigation system by considering potential mistakes comprises calculating, using the navigation system, at least one route. The method also comprises querying a map database to identify one or more intersections along the at least one route. The method further comprises calculating a predicted probability of a user making a routing mistake at the one or more intersections. The method further comprises calculating a travel time, a travel distance, or a combination thereof that is predicted to result from the user making the routing mistake. The travel time, the travel distance, or a combination thereof represents a predicted severity of the routing mistake. The method further comprises initiating a recalculation of the at least one route to accept or avoid the one or more intersections based on the predicted probability of the user making the routing mistake and the predicted severity of the routing mistake. The method further comprises presenting the recalculated at least one route in a user interface of the navigation system as an optimal route.

In one embodiment, the method further comprises determining a cost value of the routing mistake as a product of the predicted probability and the predicted severity. The recalculation of the at least one route is then initiated based on the cost value.

In one embodiment, the method further comprises recursively recalculating the at least one route until the predicted probability, the predicted severity, or the cost value is below a threshold value. The method further comprises designating the recalculated at least one route resulting from the recursive calculating as the optimal route.

According to another embodiment, an apparatus for performing a route calculation using a navigation system by considering potential mistakes comprises a processor, and a memory including computer program code, the memory and the computer program code configured to, with the processor, cause, at least in part, the apparatus to calculate, using the navigation system, at least one route. The apparatus is also caused to query a map database to identify one or more intersections along the at least one route. The apparatus is further caused to calculate a predicted probability of a user making a routing mistake at the one or more intersections. The apparatus is further caused to calculate a travel time, a travel distance, or a combination thereof that is predicted to result from the user making the routing mistake. The travel time, the travel distance, or a combination thereof represents a predicted severity of the routing mistake. The apparatus is further caused to initiate a recalculation of the at least one route to accept or avoid the one or more intersections based on the predicted probability of the user making the routing mistake and the predicted severity of the routing mistake. The apparatus is further caused to present the recalculated at least one route in a user interface of the navigation system as an optimal route.

In one embodiment, the apparatus is further caused to determine a cost value of the routing mistake as a product of the predicted probability and the predicted severity. The recalculation of the at least one route is then initiated based on the cost value.

In one embodiment, the apparatus is further caused to recursively recalculate the at least one route until the predicted probability, the predicted severity, or the cost value is below a threshold value. The apparatus is further caused to designate the recalculated at least one route resulting from the recursive calculating as the optimal route.

According to another embodiment, a computer-readable storage medium carries one or more sequences of one or more instructions which, when executed by one or more processors, cause, at least in part, an apparatus to calculate, using the navigation system, at least one route. The apparatus is also caused to query a map database to identify one or more intersections along the at least one route. The apparatus is further caused to calculate a predicted probability of a user making a routing mistake at the one or more intersections. The apparatus is further caused to calculate a travel time, a travel distance, or a combination thereof that is predicted to result from the user making the routing mistake. The travel time, the travel distance, or a combination thereof represents a predicted severity of the routing mistake. The apparatus is further caused to initiate a recalculation of the at least one route to accept or avoid the one or more intersections based on the predicted probability of the user making the routing mistake and the predicted severity of the routing mistake. The apparatus is further caused to present the recalculated at least one route in a user interface of the navigation system as an optimal route.

In one embodiment, the apparatus is further caused to determine a cost value of the routing mistake as a product of the predicted probability and the predicted severity. The recalculation of the at least one route is then initiated based on the cost value.

In one embodiment, the apparatus is further caused to recursively recalculate the at least one route until the predicted probability, the predicted severity, or the cost value is below a threshold value. The apparatus is further caused to designate the recalculated at least one route resulting from the recursive calculating as the optimal route.

According to another embodiment, an apparatus comprises means for calculating, using the navigation system, at least one route. The apparatus also comprises means for querying a map database to identify one or more intersections along the at least one route. The apparatus further comprises means for calculating a predicted probability of a user making a routing mistake at the one or more intersections. The apparatus further comprises means for calculating a travel time, a travel distance, or a combination thereof that is predicted to result from the user making the routing mistake. The travel time, the travel distance, or a combination thereof represents a predicted severity of the routing mistake. The apparatus further comprises means for initiating a recalculation of the at least one route to accept or avoid the one or more intersections based on the predicted probability of the user making the routing mistake and the predicted severity of the routing mistake. The apparatus further comprises means for presenting the recalculated at least one route in a user interface of the navigation system as an optimal route.

In one embodiment, the apparatus comprises means for determining a cost value of the routing mistake as a product of the predicted probability and the predicted severity. The recalculation of the at least one route is then initiated based on the cost value.

In one embodiment, the apparatus further comprises means for recursively recalculating the at least one route until the predicted probability, the predicted severity, or the cost value is below a threshold value. The apparatus is further comprises means for designating the recalculated at least one route resulting from the recursive calculating as the optimal route.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A and 4B are user interface diagrams for route calculation considering potential routing mistakes, according to various embodiments;

FIG. 7 is a diagram of a mobile terminal (e.g., handset) that can be used to implement an embodiment of the invention.

DESCRIPTION OF SOME EMBODIMENTS

Examples of a method, apparatus, and computer program for performing route calculation that considers potential routing mistakes by a user are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
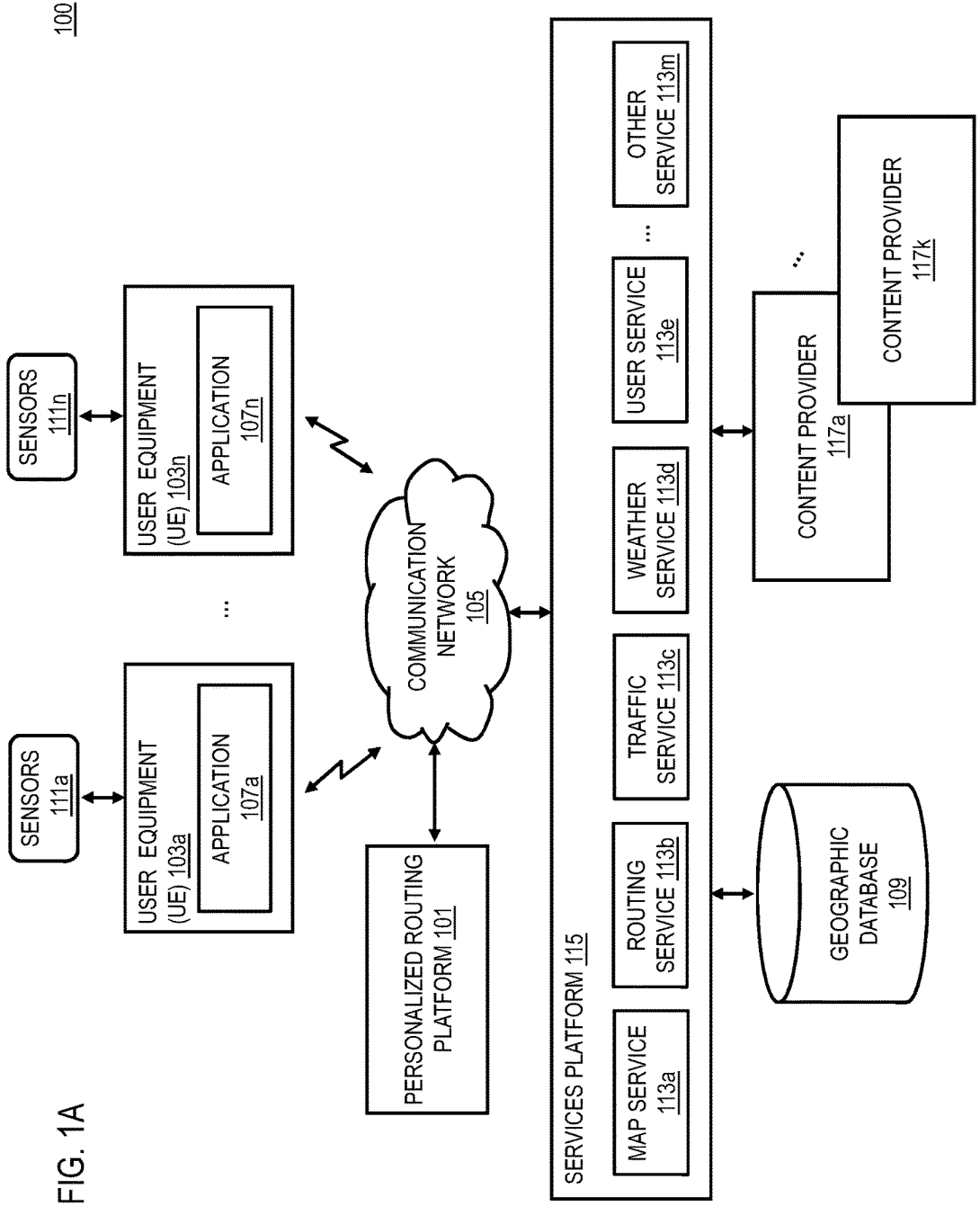
FIG. 1A is a diagram of a system capable of performing route calculation that considers potential routing mistakes by a user, according to one embodiment.

FIG. 1A is a diagram of a system capable of performing route calculation that considers potential routing mistakes by a user, according to one embodiment. It can be common for a user that is following the routing instructions or calculated route of a navigation system to make a routing mistake by missing a turn or turning too early because of any number of factors such as absent-mindedness, complex road conditions, insufficient instruction information, errors on the map, heavy traffic flow, bad weather conditions, and other like circumstances. Therefore, one technical challenge faced by service providers is enabling route calculation by considering whether users may make a routing mistake along a particular route (e.g., taking a wrong turn at an intersection) to find a more optimal route for users who suffer from mistakes.

In some cases, these factors that lead to routing mistakes relate to the actual route calculated by the navigation system itself. For example, traditional navigation systems routinely have at least two options to calculate a best or optimal route from A to B: (1) shortest route, or (2) fastest route. Although the calculated route might be actually shortest or fastest, user may not be able to follow the route or routing instructions at all times, and might make a routing mistake by, for instance, taking a wrong turn. Whenever a user makes a routing mistake during a trip, the user's actual route traveled is often longer and/or slower than the calculated best or optimal route (e.g., shortest or fastest route). In addition, routing mistakes can also result in consuming additional computational resources (e.g., computing resources, bandwidth resources when streaming map data over a network, etc.) by a navigation system, when a system has to recalculate in response to each mistake to reroute a user. These recalculations can also result in a cascade of additional routing mistakes as the user operates with navigation guidance during a recalculation period, thereby leading to a poor user experience.

To address these technical challenges and problems, a system 100 introduces a capability for predicting a probability that a user will make a mistake along a route and a severity of that mistake (e.g., expressed as additional distance or time that would be added based on the mistake), and then considering the probability and severity of the mistake when performing a route calculation. It is noted that the embodiments described herein is particularly useful or beneficial when a calculated route involves some complex maneuvers where a user is likely to make a routing mistake, and this mistake may lead to significant increase in travel distance and/or time. In this case, for instance, the system 100 can find a route that is easier (e.g., containing segments where a user is less likely to make a routing mistake) or more error-tolerant (e.g., containing segments where a routing mistake will not result in a significant increase in distance and/or time), so that the user can arrive at a destination with minimal impact on travel distance or time but with a lower chance of making mistakes or a lower cost on mistakes during the trip. In this way, the system 100 advantageously reduces the expected travel distance and/or time considering potential mistakes that a user may encounter. In addition, the system 100 can also advantageously reduce the use of navigation system resources that would be used to recalculate a route after a user makes a routing mistake.

As shown in FIG. 1A, in one embodiment, the system 100 includes a personalized routing platform 101 to perform the functions associated with route calculation that considers potential routing mistakes by a user. The system 100 also includes one or more user equipment 103a-103n (also collectively referred to as UEs 103) with connectivity to the personalized routing platform 101 over a communication network 105. In one embodiment, the UEs 103 are navigation systems or other devices (e.g., mobile devices) capable of executing respective applications 107a-107n (also collectively referred to as applications 107) configured to perform route calculation considering potential routing mistakes as described according to the various embodiments discussed herein. In one embodiment, the UEs 103 can act independently or as a client of the personalized routing platform 101 to perform route calculation. In one embodiment, the UEs 103 and/or the applications 107 can perform all or a portion of the functions of the personalized routing platform 101.

In one embodiment, a user can request, via the UE 103, a navigation route from a first location (e.g., location A) to a second location (e.g., location B). These two locations may be any two locations between an initial departure location and a final destination location with zero to many stopover locations, including the departure and destination locations. The personalized routing platform 101 then uses at least one routing engine or algorithm to calculate an initial or baseline route from location A to location B with zero to many intermediate waypoints. By way of example, the routing engine or algorithm is a traditional routing engine or algorithm known in the art that is capable of generating a route according to at least one specific definition of what is an optimal route such as a shortest or fastest route.

In one embodiment, the personalized routing platform 101 then queries a geographic database 109 (e.g., also referred to as a map database) to identify intersections that occur along the initial or baseline route calculated above. The intersections represent, for instance, potential locations along the route at which routing mistakes by the user can happen (e.g., by taking a wrong turn at the intersection or failing to make a turn at the intersection).

Then, in one embodiment, for each intersection, the personalized routing platform 101 calculates a predicted probability of that a user (e.g., the user that requested the route calculation) will make a routing mistake at the particular intersection. In one embodiment, the personalized routing platform 101 can use the predictive model of potential user behavior while traveling a route as described in U.S. Ser. No. 14/719,891 to calculate the probability of the mistake. In one embodiment, the calculation of the predicted probability can be based on information regarding the route, the intersection, the user, other drivers traveling near the intersection or route, the traffic, the weather, and/or any other conditions that might be relevant to the predicted probability of a routing mistake occurring.

In one embodiment, the personalized routing platform 101 evaluates the predicted probability for each possible mistake/intersection. If the probability of making the evaluate mistake is above a certain threshold, the personalized routing platform 101 can recalculate at least one optimal route from the recalculation point (e.g., the intersection where the probability of the mistake is above a threshold value) to the location B (e.g., a destination point). In one embodiment, the probability of this mistake is the conditional probability that reflects a potential cascade of actions as a user drives from one intersection to a next intersection while following the route. More specifically, the conditional probability of this mistake is the probability of this specific mistake happening assuming that its predecessor mistake happened. In one embodiment, the personalized routing platform 101 can be configured to determine the threshold value as an arbitrary threshold (e.g., based on user input) or using an algorithm (e.g., machine learning) to set the threshold value.

In one embodiment, the personalized routing platform 101 can recursively evaluate each intersection and recalculate optimal route until the probability of any mistake is below the threshold value, all possible routes have been explored, or other predetermined criteria.

In one embodiment, the personalized routing platform 101 can also calculate a predicted severity of a routing mistake. By way of example, the predicted severity can be represented or be based on additional travel time or travel distance that would occur based on making the mistake.

In one embodiment, the personalized routing platform 101 can use a mathematical expectation of the predicted severity by calculating a product of the predicted probability of the mistake and the predicted severity of the mistake. For example, the personalized routing platform 101 can calculate the mathematical expectation of time or distance given the time or distance to spend on a sub-route times the probability of the sub-route being taken (e.g., because to a routing mistake). In one embodiment, the mathematical expectation of time or distance is also referred to as a "cost value" for the mistake. In one embodiment, the personalized routing platform 101 can then use this mathematical expectation of time or distance in place of the time or distance value when calculating an optimal route.

In one embodiment, the UEs 103 may include or have access to respective sensors 111a-111n (also collectively referred to as sensors 111). By way of example, the sensors 111 may include various sensors for determining location and/or geospatial information to support the functions of a navigation system such as routing and mapping. For example, the UEs 103 may utilize sensors 111 such as GPS or other satellite-based location receivers for determining geospatial or location information. The sensors 111 may also be used to perform cellular triangulation, assisted-GPS, or other location based techniques for determining the geographic coordinates of a UE 103. In addition, the sensors 111 may be used to gather temporal, spatial or environmental information regarding the UEs 103 and/or the roadways/intersections on which the UEs 103 are traveling. By way of example, the sensors may detect speed and location data, tilt data (e.g., a degree of incline or decline of the vehicle along a path of travel), motion data, light data, sound data, image data, weather data and the like.

Still further, the sensors 111 may detect local or transient network and/or wireless signals, such as those transmitted by nearby devices during navigation of a vehicle associated with the user. This may include, for example, network routers as configured within a premise (e.g., home or business) or other UEs 103 encountered during navigation. Other signals detected may include those transmitted by traffic related objects such as traffic lights, traffic cameras, signals, digital signage or the like. It is noted that, in certain implementations, the sensors of a vehicle in which a UE 103 is present may be configured to interact with the sensors 111 of the UE 103 for enabling data exchange (e.g., geospatial information exchange) and interaction. This exchange may be facilitated by way of any known or still developing range based or wireless communication protocols.

As noted above, in one embodiment, the personalized routing platform 103 performs the functions associated with providing personalized routing based on user routing mistakes. In one embodiment, the system 100 includes an infrastructure for sharing geospatial information in real-time on multiple devices that includes a map-based service, application, and/or web interface that provides a typical map user interface. By way of example, a map-based service 113a, application, and/or interface can be provided over the communication network 105 by the services platform 115.

In one embodiment, the personalized routing platform 101 may be configured to interface directly with the services platform 115 that provides various services. For example, in addition to the map service 113a (e.g., for providing mapping data and related information), the services platform 115 may include a routing service 113b (e.g., to provide a routing engine for calculating navigation routes), a traffic service 113c (e.g., to provide traffic updates and conditions along a route), a weather service 113d (e.g., to provide weather conditions along a route), a user service 113e (e.g., to enable a user to manage account information, configure personalized preferences, and engage in social interactions with other users), and/or other services 113m (also collectively referred to as services 113). In addition, the personalized routing platform 101 and/or the services platform 115 may interface with one or more content providers 117a-117k (also collectively referred to as content providers 117) that provide/deliver content of various types and genres (e.g., geospatial information, mapping content, navigation content, travel content, locality content, marketing content) upon request. Requests may be initiated via the communication network 105 by way of one or more location based applications 107 executing on the UEs 103 that are associated with respective users. By way of example, the applications 107 may access turn-by-turn navigation, routing information, maps, driving instructions, etc., for accessing, annotating, and/or sharing geospatial information. In one embodiment, the personalized routing platform 101 can store and/or retrieve geospatial information, annotations, and/or other related information in a geographic database 109 (further described below with respect to FIG. 1B). In one embodiment, the services platform 115 and/or any of the services 113 may also have connectivity to the geographic database 109.

In one embodiment, the system 100 includes software to enhance the applications 107, the services 113, the services platform 115, the content providers 117, and/or any other component of the system 100 to enable a user to utilize navigational guidance information based on routes calculated to consider potential routing mistakes by the user. It is contemplated that the geospatial information need not be associated with a navigational route. Accordingly, in one embodiment, the system 100 can be used to augment (e.g., by automatically communicating to a user) navigational guidance with weather reports, traffic information, and other like information that may be of relevance to a user to accept or avoid a routing mistake. In one embodiment, the geospatial information and/or related route are saved on the participating users' UEs 103.

By way of example, navigational information includes, but is not limited to, information related to routes, public spaces (parks, libraries, etc.), geographic areas (towns, boroughs, city blocks, etc.), points-of-interest (restaurants, shopping, etc.), and other like navigational information. Such information may be gathered as navigational information or to supplement preexisting information, and may further include crowd source data, network information, public databases, public information (public transport schedules, etc.), and other like information. In one embodiment, navigational information also may include a number of forms including annotations related to route information, location, logos, visual images, acronyms, and other like forms that may indicate navigational information.

By way of example, the UE 103 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, embedded navigation system, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 can be a vehicle or a component part of a vehicle.

By way of example, the applications 107 may be any type of application that is executable at the UE 103, such as communication services (e.g., texting applications, calling applications, etc.), location-based service applications, navigation applications, camera/imaging application, media player applications, social networking applications, calendar applications, and the like. In one embodiment, one of the applications 107 at the UE 103 may act as a client for the personalized routing platform 101 and perform one or more functions of the personalized routing platform 101. In one scenario, users are able to select a destination via one or more map applications. In one embodiment, one or more receivers of the UE 103 may process and present routes that are calculated by considering potential routing mistakes that the user has a probability of making.

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
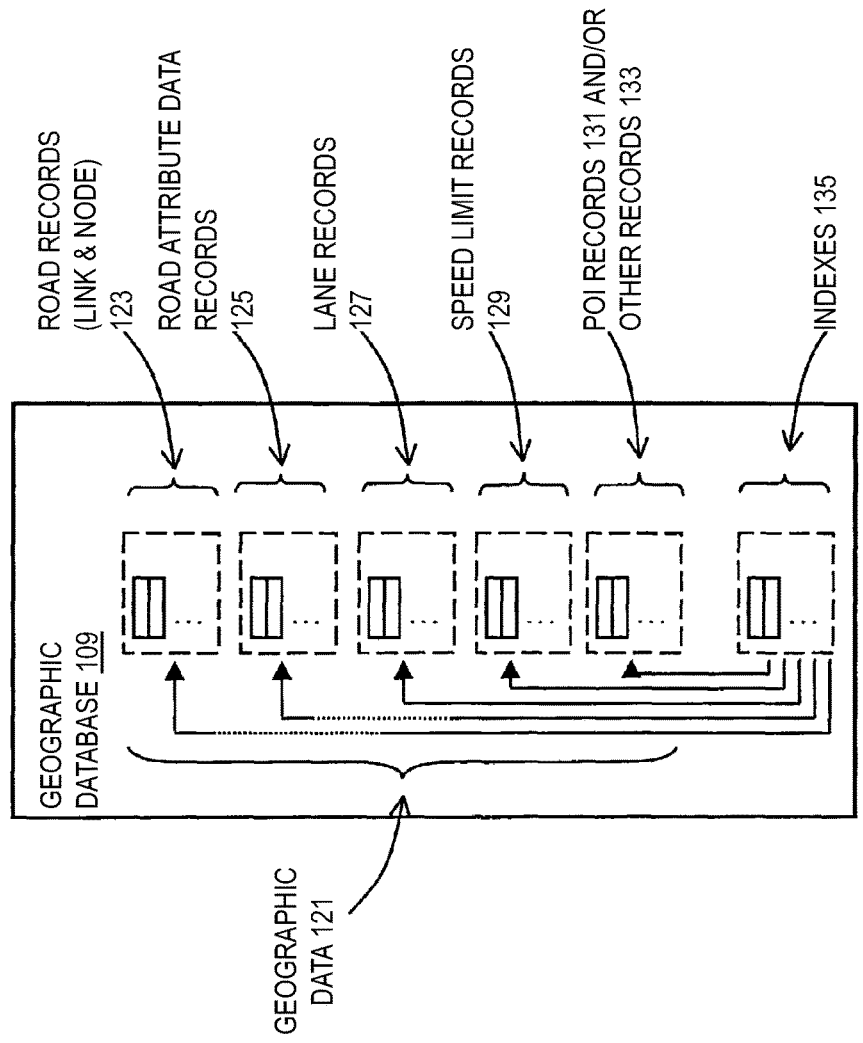
FIG. 1B is a diagram of the geographic or map database, according to one embodiment.

FIG. 1B is a diagram of the geographic database 109 (e.g., also referred to as a map database) of system 100, according to exemplary embodiments. In the exemplary embodiments, previous behavioral information (e.g., routing mistakes, predicted probabilities of the mistakes, predicted severity of the mistakes, cost values computed for the mistakes, mathematical expectation of time or distance, navigational guidance information, and at least one predictive model can be stored, associated with, and/or linked to the geographic database 109 or data thereof. In one embodiment, the geographic or map database 109 includes geographic data 121 used for (or configured to be compiled to be used for) mapping and/or navigation-related services, such as for personalized route determination, personalized annotations, and/or geospatial information sharing, according to exemplary embodiments. For example, the geographic database 109 includes road (link and node) records 123, road attribute data records 125, lane records 127, speed limit records 129, POI data records 131, other data records 133, and indexes 135 for example. More, fewer or different data records can be provided. In one embodiment, the other data records 133 include cartographic ("carto") data records, routing data, and maneuver data. In one embodiment, the indexes 135 may improve the speed of data retrieval operations in the geographic database 109. The indexes 135 may be used to quickly locate data without having to search every row in the geographic database 109 every time it is accessed.

In one embodiment, information (e.g., components, areas, layers, features, text, and/or symbols) associated with personalized routing information (e.g., navigation instructions), usage data, predictor data, personal driving history, travel profile information, user preferences, and/or the like can be stored in, linked to, and/or associated with one or more of these data records. For example, one or more user behaviors or recorded route information can be matched with respective map or geographic records via position or GPS data associations (such as using known or future map matching or geo-coding techniques), for example.

In exemplary embodiments, the road (link and node) records 123 are links or segments representing roads, streets, or paths, as can be used in the calculated route or recorded route information for determination of one or more personalized predictive models and navigational guidance information based on one or more previous behaviors, according to exemplary embodiments. In one embodiment, the road (link and node) records 123 also include end points corresponding to the respective road links or segments. The road (link and node) records 123 represent a road network, such as used by vehicles, cars, bicycles, and/or other entities. Alternatively, the geographic database 109 can contain path segment and node data records or other data that represent pedestrian paths or areas in addition to or instead of the vehicle road record data, for example.

In one embodiment, the road (link and node) records 123 can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. In one embodiment, these attributes are stored in the road attribute data records 125.

In one embodiment, the geographic database 109 also include information on other characteristics of the road network stored in the road records 123. For example, the geographic database 109 may include lane records 127 to provide lane information for road or travel segments. In one embodiment, the lane information can include a number of lanes, dimensions of the lanes, direction of travel of the lanes, and/or any other lane attributes or characteristics. As another example, the geographic database 109 may include speed limit records 129 that include information related to speed limits for road or travel segments. In one embodiment, speed limit information may include the actual speed limit as well as conditions or criteria for when the limits are applicable. For example, different speed limits can be specified based on time of day, type of vehicle, weather conditions, etc.

In one embodiment, the geographic database 109 can include data about POIs and their respective locations in the POI data records 131. The geographic database 109 can also include data about places, such as cities, towns, or other communities, and other geographic features, such as bodies of water, mountain ranges, etc. Such place or feature data can be part of the POI data 131 or can be associated with POIs or POI data records 131 (such as a data point used for displaying or representing a position of a city).

The geographic database 109 can be maintained by the content provider 117 (e.g., a map developer) in association with the services platform 115. The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database 109 or data in the master geographic database 109 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the geographic database 109 can represent a compiled navigation database that can be used in or with end user devices (e.g., UEs 103) to provided navigation-related functions. For example, the geographic database 109 can be used with the end user device 103 to provide an end user with navigation features. In such a case, the geographic database 109 can be downloaded or stored on the end user device UE 103, such as in applications 107, or the end user device UE 103 can access the geographic database 109 through a wireless or wired connection (such as via a server and/or the communication network 105), for example.

In one embodiment, the end user device or UE 103 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 103 can be a cellular telephone. An end user can use the device UE 103 for navigation functions such as guidance and map display, for example, and for ranking of one or more road links.

Figure 2:
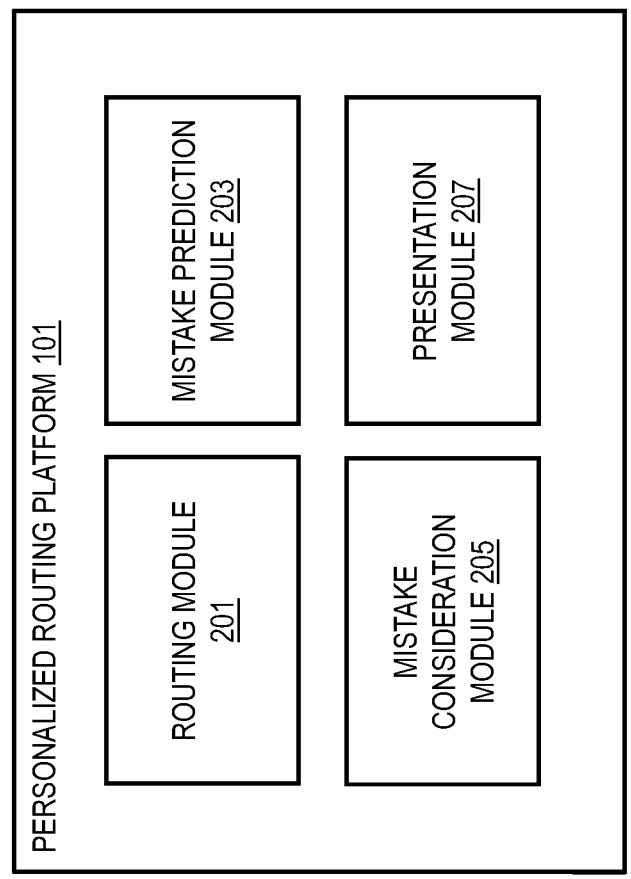
FIG. 2 is a diagram of the components of a personalized routing platform, according to one embodiment.

FIG. 2 is a diagram of the components of a personalized routing platform 101, according to one embodiment. By way of example, the personalized routing platform 101 includes one or more components for performing route calculation that considers potential routing mistakes by a user. It is contemplated that the functions of these components may be combined in one or more components or performed by other components of equivalent functionality. In one embodiment, the personalized routing platform 101 includes a routing module 201, a mistake prediction module 203, a mistake consideration module 205, and a presentation module 207.

In one embodiment, the routing module 201 processes routing requests from a user to calculate a route. The routing module 201 uses conventional navigation routing engines and/or algorithms to general an initial route that is optimal according to traditional criteria (e.g., shortest time or shortest distance). In other words, the routing module 201 does not consider potential user routing mistakes when generating or calculating this initial route.

In one embodiment, the routing module 201 also identifies all intersections along the calculated route. For example, the routing module 201 can query the map database to identify locations along the route where a roadway crosses, joins, or diverges from another roadway. The list of intersections or locations of the intersections can then be stored in a record for subsequent processing.

After calculating the initial route and determining the intersections along the calculated route, the mistake prediction module 203 calculates a predicted probability that a user will make a routing mistake at the identified intersection locations. It is contemplated that the mistake prediction module 203 can use any means or process to calculate the predicted probability of a routing mistake. The process of U.S. Ser. No. 14/719,891 is provided as one example process for predicting the probability of a routing mistake and is not intended as a limitation.

As summary of the process of U.S. Ser. No. 14/719,891 is discussed as follows. In one embodiment, the mistake prediction module 203 collects usage data as users actively use routing systems, applications, services, etc. By way of example, the usage data includes recorded and/or calculated routing information as well as characteristics or other parameters associated with the users, environment, route, devices, etc. while engaged in routing. The mistake prediction module 203 can then process the usage data to identify user behavior such as when users make routing mistakes (e.g., a deviation between a recorded route and a calculated route) as well as predictors associated with the mistakes. The mistake prediction module 203 can also identify when users take the correct routes and predictors associated with these correct handlings. In one embodiment, the predictors can be any factor, characteristic, parameter, criterion, etc. that can be associated with or correlated to user routing behaviors. By way of example, predictors include, but are not limited to, complexity, commonality, familiarity, sequence, behavior, traffic, and/or weather.

In one embodiment, the mistake prediction module 203 extracts the predictors from the usage data and then determines the weight of each predictor. In one embodiment, the weighting information can be determined with respect to a general population of users, a subset of users, and/or an individual user to provide for varying levels of personalization based on available data.

Based on the extracted predictors and/or weighting information, the mistake prediction module 203 builds a model for predicting user behavior (e.g., when a user is likely to make or not make a routing mistake). As with the processes associated with extraction of the predictor data and determination of the weighting information, the model can be created with respect to a general population of users, a subset of users, and/or an individual user. In one embodiment, the mistake prediction module 203 uses the created model to predict user behavior (e.g., routing mistakes or correct handlings) while routing to personalize routing instructions and/or services to the user based on the predictions.

In one embodiment, the mistake prediction module 203 can use the model to predict the probability of a routing mistake occurring at the locations of the intersections of the calculated route provided by routing module 201. In one embodiment, the probabilities of a mistake occurring at one particular intersection can be dependent on a mistake occurring at a previous intersection. For example, a user will only arrive at a subsequent intersection if the user made a wrong turn (e.g., routing mistake) at a previous intersection that led to the subsequent intersection. Accordingly, as discussed above, the mistake prediction module 203 can calculate a probability of a mistake occurring as a conditional probability of the user taking a particular sub-route at a previous intersection.

In one embodiment, the mistake prediction module 203 can also calculate a severity of the routing mistake. In one embodiment, the severity is based on an additional distance or time that can result from making a routing mistake. For example, the mistake prediction module 203 can interact with the routing module 201 to determine what amount of time or distance would be incurred by traveling a sub-route as a consequence of a routing mistake.

After predicting the probabilities or mistakes and the severity of those mistakes, the mistake prediction module 203 interacts with the mistake consideration module 205 to calculate an optimal route that accounts for potential user mistakes by routing around intersections where the product of predicted probability and severity is above a threshold value. In one embodiment, the mistake consideration module 205 uses a product or multiplication of the probability of a mistake and a severity of the mistake as a mathematical expectation or cost value associated with that mistake. In this way, the mistake consideration module 205 can make routing decisions to balance or normalize the probability of a mistake against the severity or consequences of that mistake.

For example, in one case, a user maybe navigating on a highway where if makes a routing mistake and misses a first exit from the highway, the next exit is 50 miles away. The calculated probability of the user missing the exit can be relatively low (e.g., 0.1 probability), but the severity is relatively high (e.g., 50 miles) resulting in a product of 50×0.1=5. Another available route, may have a hidden turn that is often missed (e.g., 0.8 probability) but the consequences of missing the turn is only an extra 2 miles (e.g., because the roadway rejoins roadway that was missed further downstream) resulting in a cost value of 0.8×2=1.6. Therefore, the mistake consideration module 205 may trigger a recalculation of the initial route at the decision location between taking the one exit highway and the hidden turn roadway to route the user over the hidden turn roadway even if the hidden turn roadway were not shortest or fastest under traditional routing schemes.

In one embodiment, the mistake consideration module 205 uses the following algorithm to recursively calculate the expected cost from departure to destination considering possible routing mistakes by a user. The cost of taking one action (e.g., turning right) at an intersection is equal to the actual cost (e.g., the distance or time between these two intersections) of travelling from this intersection to the next intersection by this action (i.e., turning right) plus the mathematical expectation of the cost at the next intersection considering all possible actions (e.g., turning left, going straight, turning right, taking U-turn). The mathematical expectation of the cost at an intersection is equal to the sum of all products where each product is the multiplication of the probability of taking each action at this intersection times the cost of taking this action at this intersection. The cost of taking any action at destination is zero.

In one embodiment, the mistake consideration module 205 uses the following equation to recursively calculate the expected cost from departure to destination considering possible routing mistakes by a user:

$$R(m, s_i^m, X) = D(m, s_i^m, X) + \sum_{s_j^n \in S^n} P(s_j^n \mid C) \cdot R(n, s_j^n, X)$$

where, $R(m, s_i^m, X)$ is the expected cost of taking action $s_i^m$ at intersection m, $D(m, s_i^m, X)$ is the actual cost after taking action $s_i^m$ at intersection m, which could be the distance or time from this intersection to the next intersection, $P(s_j^n | C)$ is the probability of taking action $s_j^n$ at intersection n given the prior C, $R(n, s_j^n, X)$ is the expected cost of taking action $s_j^n$ at intersection n, m and n are adjacent intersections on the road network, $s_i^m$ is one action among all valid actions $S^m$ at intersection m, $S_j^n$ is one action among all valid actions $S^n$ at intersection n, X is a vector of parameters other than intersection and action in each function.

In one embodiment, the mistake consideration module 205 selects the route with the least expected time/distance cost as determined above as the optimal route when consideration potential user routing mistakes.

In one embodiment, the presentation module 207 may then present the route selected by the mistake consideration module 205 via the UE 103 or other navigation system to a user. In one embodiment, the route can be marked or indicated as a route that reduces potential routing mistakes.

Figure 3:
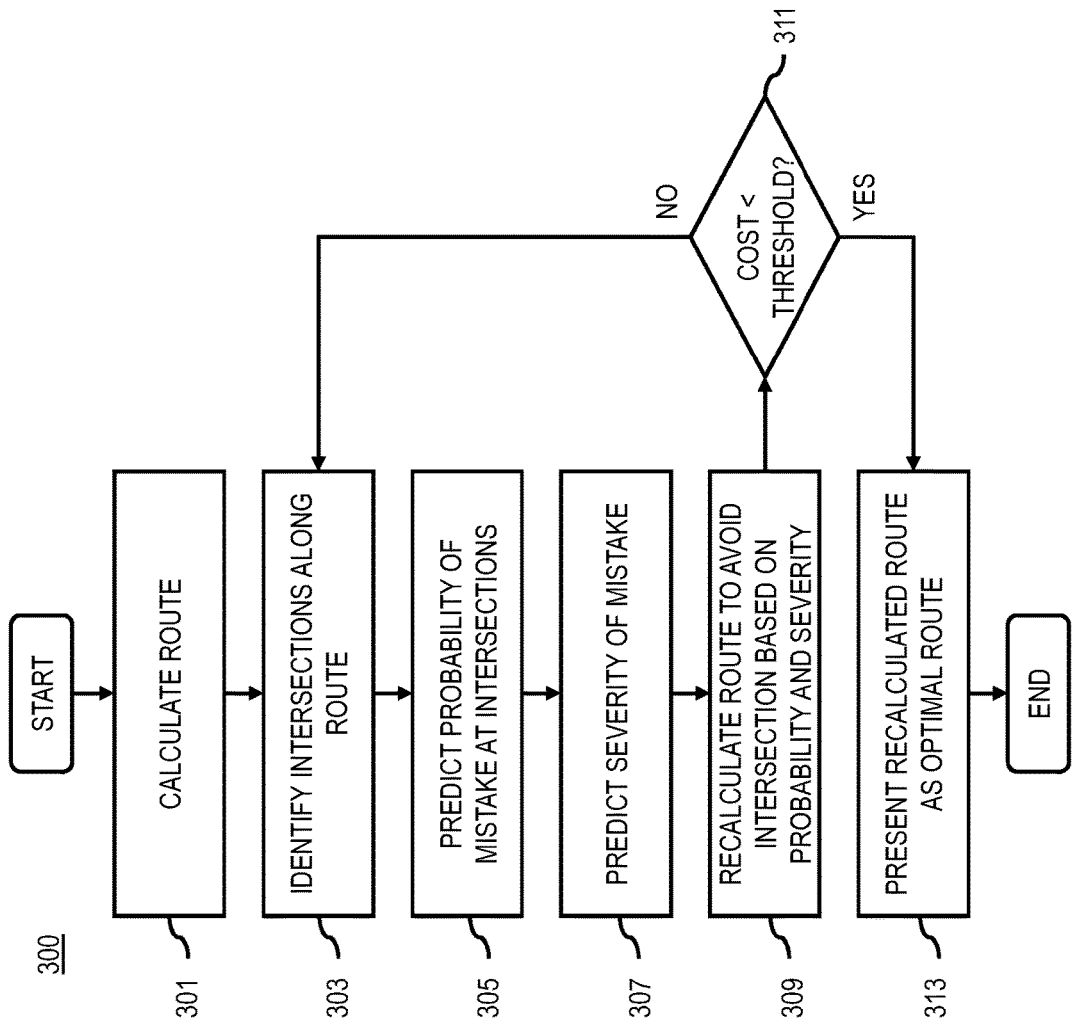
FIG. 3 is a flowchart of a process for performing route calculation that considers potential routing mistakes by a user, according to one embodiment.
Figure 6:
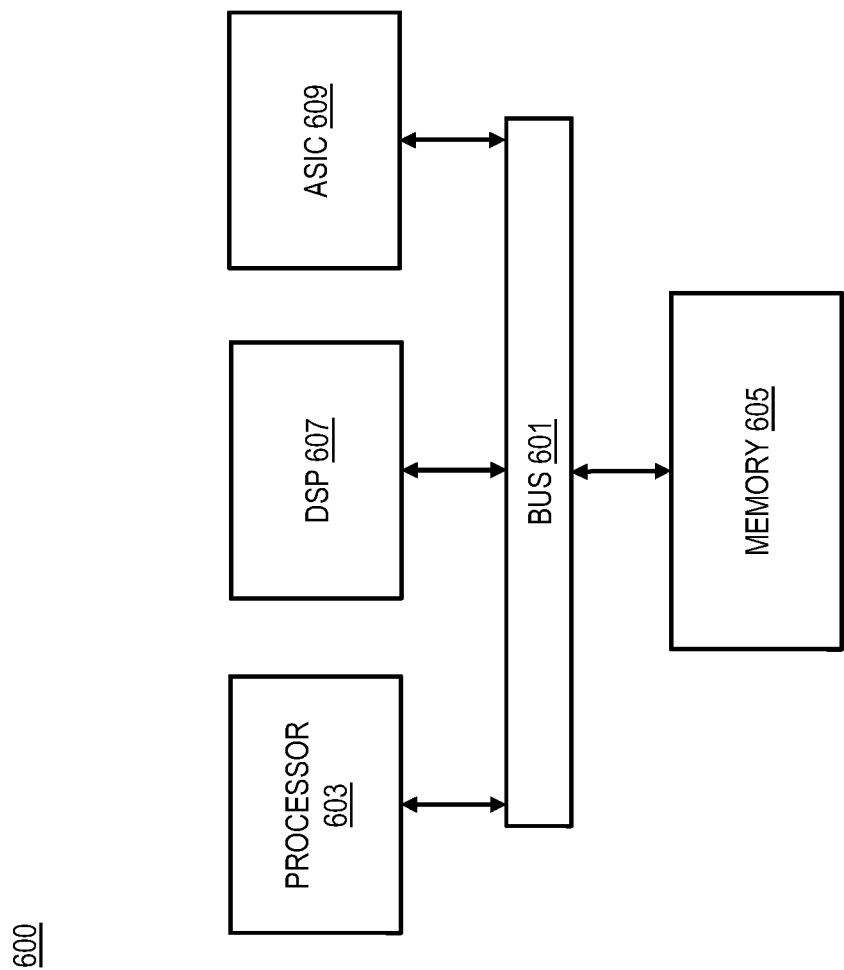
FIG. 6 is a diagram of a chip set that can be used to implement an embodiment of the invention.

FIG. 3 is a flowchart of a process for creating a predictive model based on user routing behaviors, according to one embodiment. In one embodiment, the personalized routing platform 101 performs the process 300 and is implemented in, for instance, a chip set including a processor and a memory as shown in FIG. 6.

In step 301, the personalized routing platform 101 calculates, using a navigation system, at least one route. In one embodiment, the route is calculated from a first location to a second location. For example, the first location and the second location can be respectively a starting point and a destination point. The route can also include any number of stopover points or waypoints. It is further contemplated that the first location and the second location need not be the starting point or destination, and can correspond to any of the stopover points or waypoints of the route. As previously discussed, a user can request the route calculation using, for instance, a navigation system such as a UE 103.

In step 303, the personalized routing platform 101 queries a map database to identify one or more intersections along the at least one route.

In step 305, the personalized routing platform 101 calculates a predicted probability of a user making a routing mistake at the one or more intersections. In one embodiment, the routing mistake is a deviation from the at least one route that is detectable using one or more sensors of the navigation system. For example, the navigation system may monitor a location trace (e.g., generated from GPS sensor data) to determine whether there is a deviation from the route active in the navigation system.

In one embodiment, the personalized routing platform 101 retrieves a predictive driving behavior model for the user. In one embodiment, the predictive driving behavior model is generated according to process of U.S. Ser. No. 14/719,891. The predictive probability of the user making the routing mistake is then calculated using the predictive driving behavior model.

In one embodiment, the one or more intersections represent all of a plurality of intersections along the route. The personalized routing platform 101 then calculates the predicted probability and the predicted severity for each one of the one or more intersections.

In one embodiment, the personalized routing platform 101 calculates the predicted probability for each one of the one or more intersections as a conditional probability of the routing mistake occurring at the each one of the one or more intersections based on a previous routing mistake occurring at a previous one of the one or more intersections along the at least one route.

In step 307, the personalized routing platform 101 calculates a travel time, a travel distance, or a combination thereof that is predicted to result from the user making the routing mistake. In one embodiment, the travel time, the travel distance, or a combination thereof represents a predicted severity of the routing mistake. In other words, the travel time or travel distance is the increase in travel time or distance incurred when traveling over a sub-route because of a routing mistake. For example, if a predicted routing mistake is that a user fails to make a right turn at an intersection and proceed straight through the intersection, then the increased travel time or travel distance is the amount of time or distance traveled over a sub-route resulting from the mistake (e.g., a portion of a route that ultimately rejoins the original route if the routing mistake is not made) when compared to amount of time or distance traveled over an equivalent sub-route of the original route.

In step 309, the personalized routing platform 101 initiates a recalculation of the at least one route to avoid the one or more intersections based on the predicted probability of the user making the routing mistake and the predicted severity of the routing mistake.

In one embodiment, the personalized routing platform 101 determines a cost value of the routing mistake as a product of the predicted probability and the predicted severity. The cost value, for instance, represents the mathematical expectation of time or distance that will be incurred by a routing mistake rather than the actual time or distance. Using this mathematical expectation in place of the actual value, for instance, enables the personalized routing platform 101 to balance mistakes against the resulting severity of the mistakes. For example, in cases where little to no added time or distance (e.g., below a minimum threshold) is predicted to occur, the personalized routing platform 101 can still select a route that may include the mistake rather than selecting another route that my result in increasing the distance or time traveled. In one embodiment, the recalculation of the at least one route is initiated based on the cost value.

In one embodiment, the personalized routing platform 101 recursively recalculates the at least one route until the predicted probability, the predicted severity, or the cost value is below a threshold value (step 311). For example, as shown in FIG. 3, after the route is recalculated to avoid a particular intersection, the process 300 returns to step 303 to identify intersections along the newly recalculated route and predict the probability mistakes and resulting severity for intersections along the newly recalculated route. In one embodiment, the recursion can occur until a route is found that meets the cost threshold, until no alternate routes are available to meet the cost threshold, until a predetermined number of recalculations, or according to any other criteria configured in the personalized routing platform 101.

In one embodiment, performing the route calculation recursively enables the personalized routing platform 101 to collect information about all routing mistakes and intersections to the select an optimal route that is not the simplest (e.g., avoiding all possible mistakes) at the expense of time or distance. Instead, the use of the cost value or mathematical expectation results in accepting or avoiding mistakes based on severity so that less severe mistakes can still be allowed. Once the cost value for a route is below a threshold value, the process 300 proceeds to step 313.

In step 313, the personalized routing platform 101 presents the recalculated at least one route in a user interface of the navigation system as an optimal route that considers the potential mistakes. In one embodiment, the recursively recalculated route is designated as the optimal route.

Figure 4B:
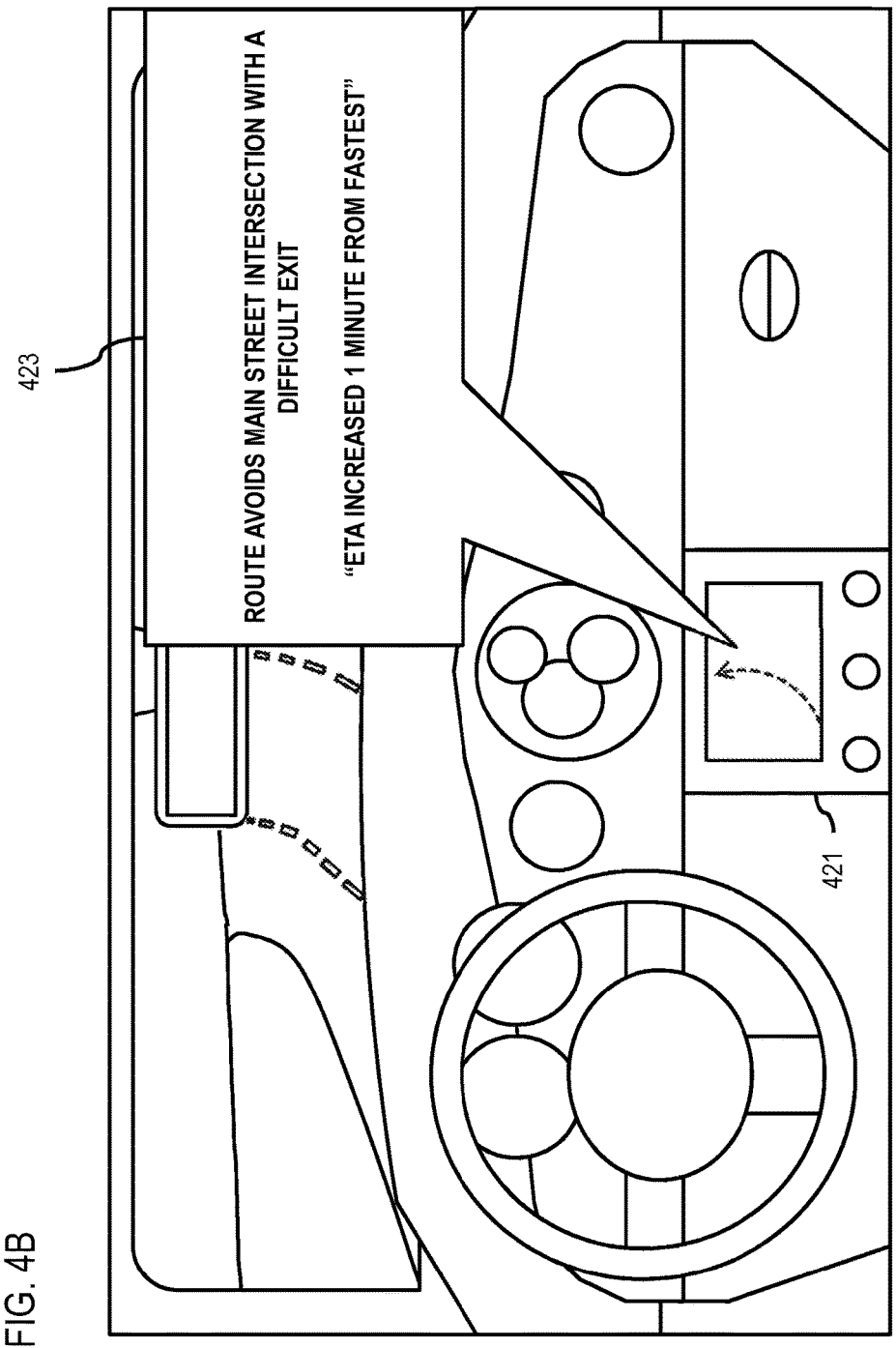

FIGS. 4A and 4B are user interface diagrams for route calculation considering potential routing mistakes, according to various embodiments. FIG. 4A depicts an example navigation system user interface 401 in which a user can enter a destination 403 and then select from among routing options 405a-405c for calculating the route to the destination 403 from a current location of the user. In this example, the user interface 401 provides a shortest routing option 405a for calculating a route with the shortest distance, a fastest routing option 405b for calculating a route with the fastest travel time, and an option 405c to consider potential mistakes while calculating a route. In this example, the options 405a (shortest route) and 405b (fastest route) are selected independently of option 405c (consider potential routing mistakes route calculation). In one embodiment, selecting 405a (shortest route) along with option 405c (consider potential routing mistakes) results in configuring the personalized routing platform 101 to use distance to represent severity when calculating the predicted severity of predicted routing mistakes. On the other hand, selecting 405b (fastest route) along with option 405c (consider potential routing mistakes) results in configuring the personalized routing platform 101 to use time to represent severity when calculating the predicted severity of predicted routing mistakes.

The definition of an optimal route can also be a combination of time and distance. In one embodiment, a one-dimensional slide bar with time and distance on each side may be presented to the user, so that the user may choose the weight between the two factors. In another embodiment, other possible definition of what is an optimal route, such as gas consumption and scenic attractiveness, may be added to this user interface with input boxes, slide bars, and/or other visual representations for user input. All these user interface options are illustrated by way of example, and not by way of limitation.

As shown in FIG. 4A, the user has selected routing option 405b in combination with routing option 405c to consider potential mistakes using increased time to travel a route to represent the predicted severity of a routing mistake. This selection configures the navigation system to calculate a navigation by considering potential routing mistakes as discussed with respect to the various embodiments described herein.

Per the embodiments of the processes for calculating a route considering potential mistakes, the navigation system calculates an initial route from the current location to the user's home using, for instance, a shortest distance option. The personalized routing platform 101 identifies the intersections that are along the route to the user's home destination. In one embodiment, the personalized routing platform 101 retrieves a personalized predictive model for the user's driving behavior (e.g., created based on the user's personal driving history). It is noted that the platform 101 can also use a general predictive model (e.g., created using the driving histories of a general population of drivers or drivers with similar characteristics of the user).

In this example, the predictive model for the user indicates that there is one intersection (e.g., Main Street intersection) on the initial route at which the user has a high probability (0.5) of making a wrong turn and the consequence of that mistake is predicted to be relatively severe (adding an additional 20 mins to the user's travel time). The personalized routing platform 101 determines that the cost value (e.g., product of probability and severity) meets a threshold for recalculating the initial route to avoid the intersection, and determines that that cost of avoidance is only one additional minute of travel time, which falls within an acceptable window configured in the navigation system.

Accordingly, the route is recalculated to avoid the Main Street intersection and presented to the user on the navigation system 421 depicted FIG. 4B as a route calculated to consider potential mistakes by the user. In the example of FIG. 4B, the navigation system 421 presents a notification 423 that the route is avoiding the Main Street intersection because of the difficult exit (e.g., as indicated by the user's personal driving history of missing the exit in the past when driving under similar conditions, or missing exits with similar characteristics under similar conditions) at the expense of only 1 additional minute of travel time. It is noted that the notification 423 is provided only as an example. In other embodiments, the navigation system 421 need not present any notification and instead may immediately present the route and associated guidance instructions to the user.

The processes described herein for performing route calculation that considers potential routing mistakes by a user may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
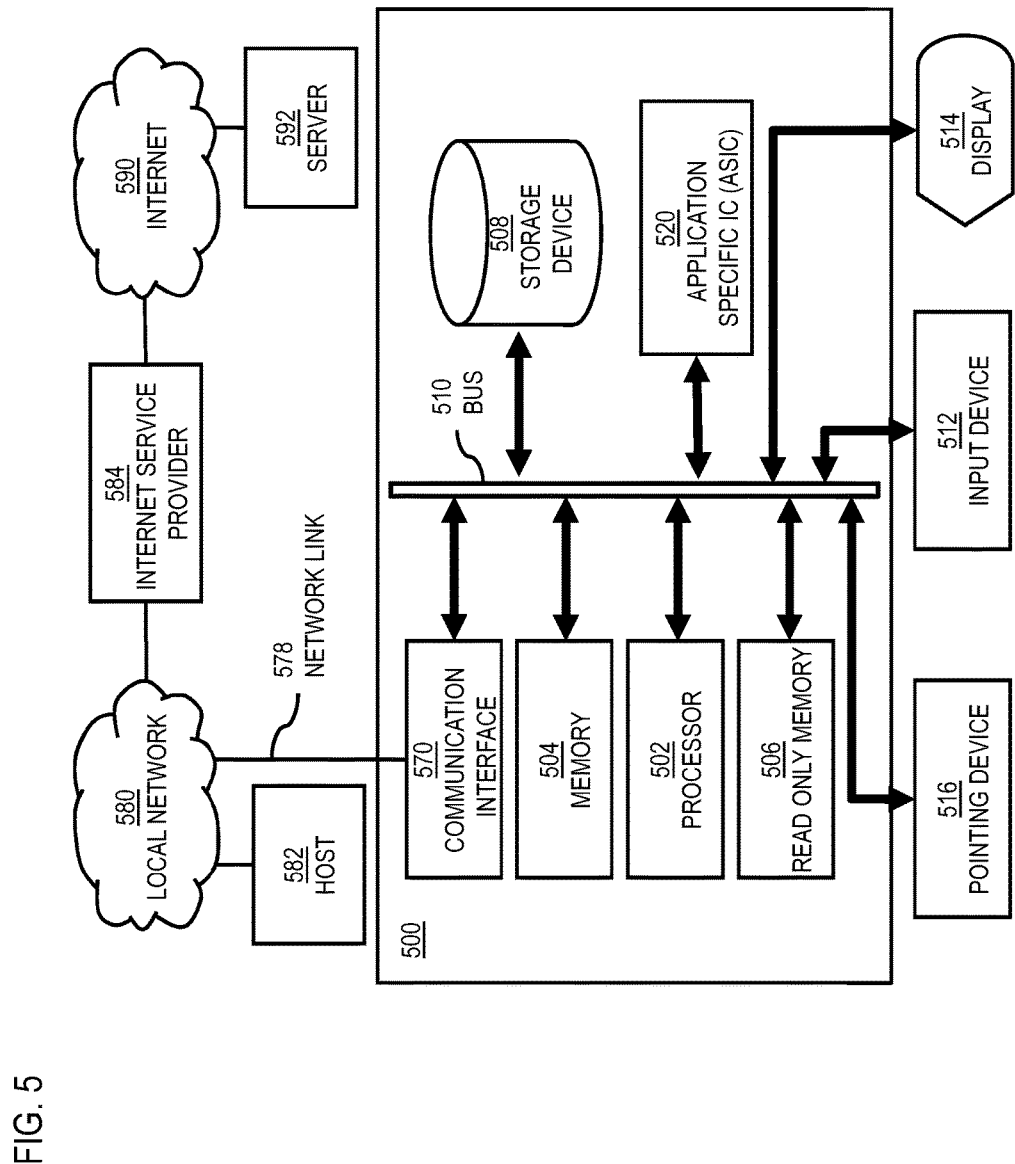
FIG. 5 is a diagram of hardware that can be used to implement an embodiment of the invention.

FIG. 5 illustrates a computer system 500 upon which an embodiment of the invention may be implemented. Computer system 500 is programmed (e.g., via computer program code or instructions) to perform route calculation that considers potential routing mistakes by a user as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to performing route calculation that considers potential routing mistakes by a user. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for performing route calculation that considers potential routing mistakes by a user. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for performing route calculation that considers potential routing mistakes by a user, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN 580, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for performing route calculation that considers potential routing mistakes by a user. In one embodiment, the connection to the communication network 105 is facilitated through connection to an internet service provider 584 that provides access to Internet 590. In one embodiment, the Internet 590 is part of the communication network 105 to provide access to devices or other components with connectivity to the Internet 590 such as a server 592 (e.g., the personalized routing platform 101, the services platform 115, etc.).

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 6 illustrates a chip set 600 upon which an embodiment of the invention may be implemented. Chip set 600 is programmed to perform route calculation that considers potential routing mistakes by a user as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to perform route calculation that considers potential routing mistakes by a user. The memory 605 also stores the data associated with or generated by the execution of the inventive steps.

FIG. 7 is a diagram of exemplary components of a mobile station 701 (e.g., the UE 103) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions that offer automatic contact matching. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile station 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile station 701 to perform route calculation that considers potential routing mistakes by a user. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for performing a route calculation using a navigation system by considering potential mistakes, comprising:
    calculating, using the navigation system, at least one route between a starting point and a destination;
    querying a map database to identify an intersection along the at least one route;
    calculating a predicted probability of a user making a routing mistake at the intersection;
    calculating a travel time, a travel distance, or a combination thereof that is predicted to result from the user making the routing mistake, wherein the travel time, the travel distance, or a combination thereof represents a predicted severity of the routing mistake;
    determining a cost value of the routing mistake as a product of the predicted probability and the predicted severity;
    recalculating the at least one route to avoid the intersection when the cost value is above a threshold value; and
    presenting the recalculated at least one route in a user interface of the navigation system as an optimal route.

2. The method of claim 1,
    wherein the predicted severity of the routing mistake is calculated based on the travel time and the travel distance.

3. The method of claim 1, further comprising:
    accepting the intersection as a part of the at least one route, when the cost value is below the threshold value;
    recursively calculating a cost value of a subsequent routing mistake for a subsequent intersection along the at least one route until reaching the destination; and
    designating the calculated at least one route resulting from the recursive calculating as the optimal route.

4. The method of claim 3, further comprising:
    calculating a predicted probability and a predicted severity for each subsequent intersection to determine a respective cost value.

5. The method of claim 4, further comprising:
    calculating the predicted probability for the subsequent intersection as a product of a conditional probability of the subsequent routing mistake occurring at the subsequent intersection and a previously calculated probability of a previous routing mistake occurring at a previous intersection along the at least one route.

6. The method of claim 1, further comprising:
    retrieving a predictive driving behavior model personalized for the user based, at least in part, on a routing mistake history of the user,
    wherein the predicted probability of the user making the routing mistake is calculated using the predictive driving behavior model.

7. The method of claim 1, wherein the routing mistake is a deviation from the at least one route that is detectable using a plurality of sensors of the navigation system, wherein one of the plurality of sensors is configured to communicate with a traffic related object to collect data.

8. The method of claim 7, wherein other ones of the plurality of sensors are correspondingly configured to collect data from a vehicle, a device within a premise, or a mobile device.

9. The method of claim 1, further comprising:
    retrieving a general predictive driving behavior model associated with a plurality of users from a general population of drivers,
        wherein the predicted probability of the user making the routing mistake is calculated using the general predictive driving behavior model.

10. An apparatus for performing a route calculation using a navigation system by considering potential mistakes, comprising:
    a processor; and a memory including computer program code for a program, the memory and the computer program code configured to, with the processor, cause the apparatus to perform at least the following, calculate, using the navigation system, at least one route between a starting point and a destination;

query a map database to identify an intersection along the at least one route;

calculate a predicted probability of a user making a routing mistake at the intersection;

calculate a travel time, a travel distance, or a combination thereof that is predicted to result from the user making the routing mistake, wherein the travel time, the travel distance, or a combination thereof represents a predicted severity of the routing mistake;

determine a cost value of the routing mistake as a product of the predicted probability and the predicted severity;

recalculate the at least one route to avoid the intersection when the cost value is above a threshold value; and present the recalculated at least one route in a user interface of the navigation system as an optimal route.

11. The apparatus of claim 10, wherein the predicted severity of the routing mistake is calculated based on the travel time and the travel distance.

12. The apparatus of claim 10, wherein the apparatus is further caused to:

accept the intersection as a part of the at least one route, when the cost value is below the threshold value;

recursively calculate a cost value of a subsequent routing mistake for a subsequent intersection along the at least one route until reaching the destination; and designate the calculated at least one route resulting from the recursive calculating as the optimal route.

13. The apparatus of claim 10, wherein the apparatus is further caused to: calculate a predicted probability and a predicted severity for each subsequent intersection to determine a respective cost value.

14. The apparatus of claim 13, wherein the apparatus is further caused to: calculate the predicted probability for the subsequent intersection as a product of a conditional probability of the subsequent routing mistake occurring at the subsequent intersection and a previously calculated probability of a previous routing mistake occurring at a previous intersection along the at least one route.

15. The apparatus of claim 10, wherein the apparatus is further caused to:

retrieve a predictive driving behavior model personalized for the user based, at least in part, on a routing mistake history of the user, wherein the predicted probability of the user making the routing mistake is calculated using the predictive driving behavior model.

16. The apparatus of claim 10, wherein the routing mistake is a deviation from the at least one route that is detectable using one or more sensors of the navigation system.

17. A non-transitory computer-readable storage medium carrying one or more sequences of one or more instructions which, when executed by one or more processors, cause an apparatus to at least perform the following steps:

calculating, using the navigation system, at least one route between a starting point and a destination;

querying a map database to identify an intersection along the at least one route;

calculating a predicted probability of a user making a routing mistake at the intersection;

calculating a travel time, a travel distance, or a combination thereof that is predicted to result from the user making the routing mistake, wherein the travel time, the travel distance, or a combination thereof represents a predicted severity of the routing mistake;

determining a cost value of the routing mistake as a product of the predicted probability and the predicted severity;

recalculating the at least one route to avoid the intersection when the cost value is above a threshold value; and presenting the recalculated at least one route in a user interface of the navigation system as an optimal route.

18. The non-transitory computer-readable storage medium of claim 17, wherein the predicted severity of the routing mistake is calculated based on the travel time and the travel distance.

19. The non-transitory computer-readable storage medium of claim 18, wherein the apparatus is caused to further perform:

accepting the intersection as a part of the at least one route, when the cost value is below the threshold value;

recursively calculating a cost value of a subsequent routing mistake for a subsequent intersection along the at least one route until reaching the destination; and designating the calculated at least one route resulting from the recursive calculating as the optimal route.

20. The non-transitory computer-readable storage medium of claim 17, wherein the apparatus is caused to further perform: calculating a predicted probability and a predicted severity for each subsequent intersection to determine a respective cost value.

* * * * *